United States Patent [19]

Dahlstrom

[11] 4,150,329

[45] Apr. 17, 1979

[54] METHOD AND MEANS IN AN INDUSTRIAL ROBOT FOR THE GENERATION OF A COMPLEX MOVEMENT

[75] Inventor: Lars Dahlstrom, Vasteras, Sweden

[73] Assignee: ASEA Aktiebolag, Vasteras, Sweden

[21] Appl. No.: 780,726

[22] Filed: Mar. 24, 1977

[30] Foreign Application Priority Data

Mar. 29, 1976 [SE] Sweden .................. 7603738

[51] Int. Cl.$^2$ ............................................. G05B 19/22
[52] U.S. Cl. .................................. 318/574; 318/569; 318/570
[58] Field of Search ............... 318/570, 573, 574, 575, 318/569

[56] References Cited

U.S. PATENT DOCUMENTS

| | | | |
|---|---|---|---|
| 3,026,040 | 3/1962 | Spencer | 318/573 |
| 3,497,780 | 2/1970 | Leenhouts | 318/574 |
| 3,701,888 | 10/1972 | McDaniel | 318/574 |
| 3,766,369 | 10/1973 | Watanabe et al. | 318/573 |
| 3,864,613 | 2/1975 | Cutler | 318/574 |
| 3,890,552 | 6/1975 | Devol et al. | 318/574 |

*Primary Examiner*—Robert K. Schaefer
*Assistant Examiner*—Eugene S. Indyk
*Attorney, Agent, or Firm*—Pollock, Vande Sande & Priddy

[57] ABSTRACT

A method and apparatus for moving a device, such as a robot arm, through complex movements. The complex movement is divided into a principal movement between two defined end points A, B. Superposed on the principal movement is a closed loop series of subordinate movements (at least two subordinate movements) which loop is executed, at least once, during the principal movement. Data defining the end points of both principal and subordinate movements is stored in a storage device. Both principal and subordinate movements are divided into a number of equal incremental principal and subordinate movements. The sum of the principal and subordinate incremental movements is a composite incremental movement. Signals related to each composite incremental movement are provided to a drive means for moving the device.

8 Claims, 11 Drawing Figures

METHOD AND MEANS IN AN INDUSTRIAL ROBOT FOR THE GENERATION OF A COMPLEX MOVEMENT

FIELD OF THE INVENTION

The present invention relates to a method and a means in an industrial robot for generating a complex movement.

BACKGROUND

Within certain fields for use for industrial robots (manipulators) with several degress of freedom, such as welding, grinding and polishing, there is a need of the manipulator capable of carrying out complex movements.

Certain complex patterns of movement, such as oscillation, have been obtained by superposing signals to control movement in one or two of the coordinate axes of the robot.

However, only a limited number of different oscillating movements are obtained thereby. A generalization of this technique requires the generation of complex control signals, which, besides increasing the complexity of the control system, also increases the demand on the operator. Changes between different types of oscillating movements is furthermore complicated, and accordingly this method has little flexibility.

Another possibility, which may be utilized in robots which can be programmed to move between pre-programmed points, is quite simply to program the entire complex movement by programming in the end points for all the partial movements that the robot is to complete during the complex movement. The complex movement shown in FIG. 3, for example, which is relatively simple, can be defined by programming in all the end points, 13 in number, for the 12 partial movements comprising the complex movement between A and B. This method requires a very high memory capacity because of the normally very large number of points that must be stored, and for the same reason programming or reprogramming, for example, an alteration of the principal movement AB, becomes very time-consuming.

SUMMARY OF THE INVENTION

With the method and apparatus according to the present invention, general complex movements in an industrial robot, for example, oscillations or spiral movements, can be generated in a simple manner. Further, the demands on memory capacity are low. Programming and re-programming of the movement become very simple. A standard robot may be used without additional equipment, which makes it possible in a simple and inexpensive manner to obtain arbitrary complex movements without the need of additional equipment. The method/means according to the invention further result in high flexibility since re-programming of the principal movement as well as of the superposed movement can be carried out in a simple manner.

Briefly, the complex movement is broken down into a simple movement between the end points A, B of the complex movement. Superposed on this principal movement is a closed loop series of at least two subordinate movements. The loop of subordinate movements can be selected to be executed one or more times during the principal movement. Data defining the end points of the principal and subordinate movements are stored. A divider is employed to produce a plurality to equal incremental movement signals for both principal and subordinate movements by dividing the movement (principal or subordinate) by the number of incremental movements that will be used to accomplish the desired movement. Summing the incremental principal and subordinate movement signals in any time period produces a composite incremental movement signal which is employed to drive a positioning servo loop to actually produce the desired movement.

BRIEF DESCRIPTION OF THE DRAWINGS

The method and means according to the invention will now be described in more detail with reference to the accompanying drawings, in which.

DETAILED DESCRIPTION

By combining a principal movement between two points with a movement including a closed loop consisting of at least two subordinate movements, a manipulator (or robot) is enabled to carry out any desired complex movement pattern. The complex movement is achieved by movement in accordance with its components, a principal movement (or superordinate movement) and a subordinate movement, or superposed movement.

Upon executing the movement pattern, the subordinate subordinate movements included in the closed loop are then added in turn to the incremental principal movement to produce the complex movement.

By a suitable selection of times for execution of the different incremental movements, the closed loop is run through an integral number of times while the manipulator is displaced in accordance with the principal movement. The start and end points of the manipulator coincide with the start and end points of the principal movement or with points parallel-displaced in space in relation to the programmed coordinates.

The method makes it possible for the operator in a simple and understandable manner to generate a complex movement pattern by selecting direction, length and velocity of the subordinate movements included in the pattern. Further, very simple subordinate movements can be utilized, which reduces the programming work and the need for memory capacity.

In an example of the invention to be described, the device which is moved is a robot arm or manipulator. Those skilled in the art will comprehend that any device can be subjected to the desired movement such as a welding head, cutting tool, etc.

Figure 1:
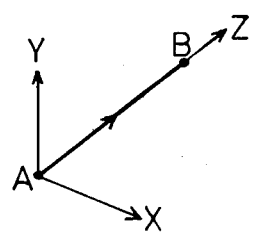
FIGS. 1–3 show examples of how an oscillating movement may be built up.

FIG. 1 shows an example of a principal movement between two points A and B, which consists of a rectilinear movement along a coordinate Z.

Figure 2:
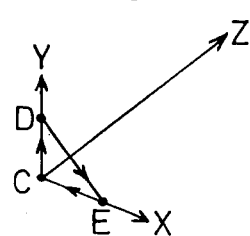

FIG. 2 shows an example of a movement C-D-E which is subordinate to the principal movement A-B, said subordinate movement consisting of subordinate movements C-D, D-E and E-C, which, in this case, are all carried out in the x-y plane.

Figure 3:
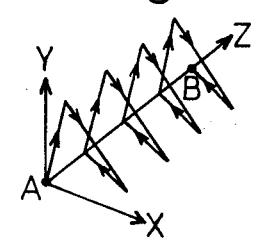

If the principal movement A-B is carried out at a constant rate, adding the subordinate movements of the closed loop C-D-E to the principal movement A-B, when the start point of the manipulator and the point A coincide, will result in the movement shown in FIG. 3, that is, an oscillating movement is obtained while moving the distance A-B.

The principal movement as well as the subordinate movement need not assume the shapes as shown in FIG. 1 and FIG. 2, but can be selected in an arbitrary manner.

Figure 4:
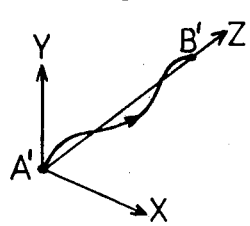
FIGS. 4–9 show examples of subordinate movements included in a complex movement.
Figure 5:
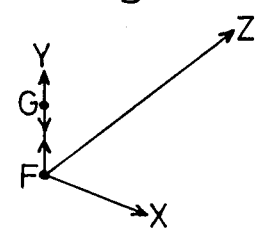
Figure 6:
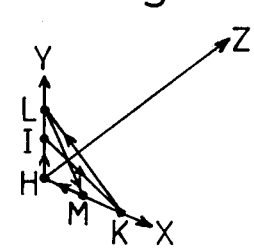
Figure 7:
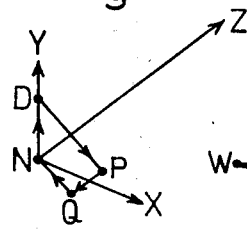
Figure 8:
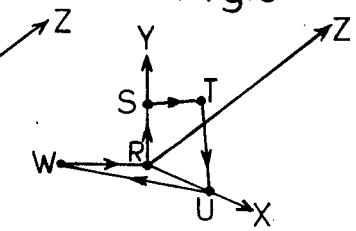

FIG. 4 shows an example of an alternative principal movement A'-B' to the movement shown in FIG. 1. FIGS. 5 and 6 show two examples of subordinate movements F-G-F and H-I-K-L-M-H, respectively, which are two-dimensional. FIGS. 7 and 8 show two further examples of subordinate movements N-O-P-Q-N and R-S-T-U-W-R, respectively, which are carried out in three dimensions.

Figure 9:
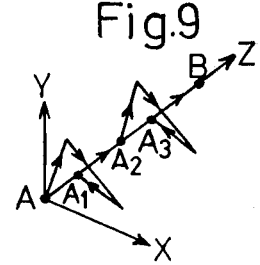

FIG. 9 further shows an example of how pauses, here two, can be programmed into the subordinate movement according to FIG. 2. During these pauses in the subordinate movement, only the principal movement takes place, $A_1$-$A_2$ and $A_3$-B, as shown in FIG. 3.

Figure 11:
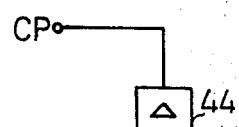
FIG. 11 shows a position servo connectible to the apparatus of FIG. 10.
Figure 11:
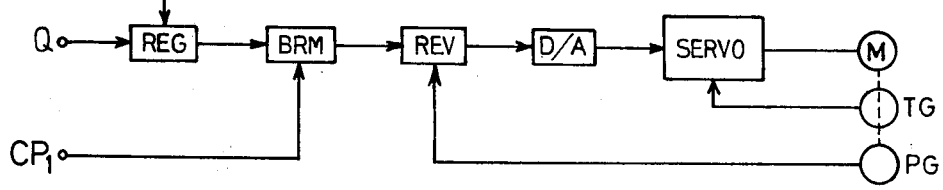
Figure 10:
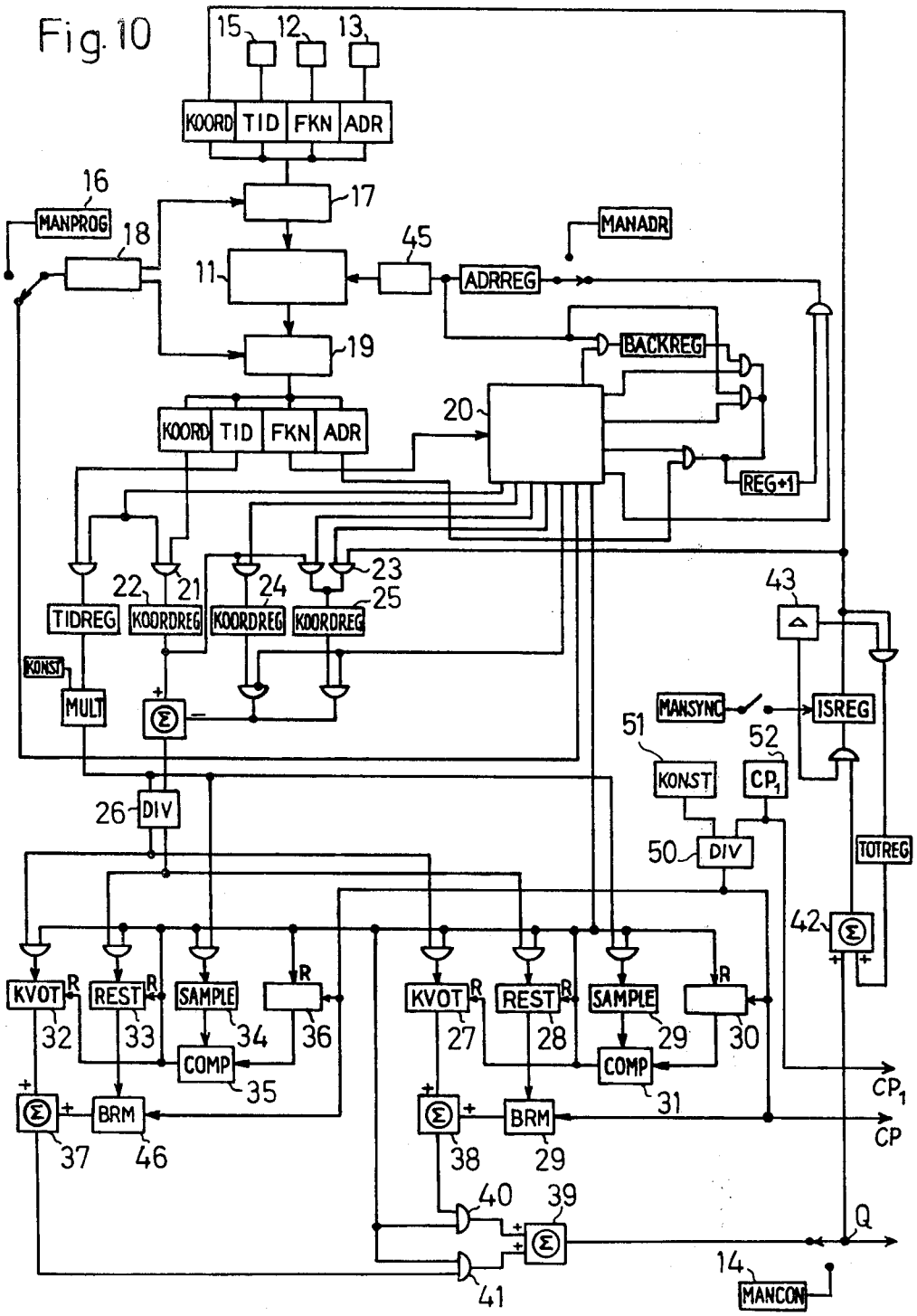
FIG. 10 shows apparatus embodying the invention.

Referring to FIGS. 10 and 11, there will now be described an embodiment of a program control member and a position servo, respectively which are intended for a manipulator to be utilized for generation of a complex pattern of movement.

The apparatus shown in FIG. 10 comprises a plurality of well known components for which the block diagram disclosure is adequate. Instructions defining the movements are stored in memory 11. Inputs to the memory 11 are provided through write circuits 17 from an input register having sections denoted KOORD, TID, FKN and ADR for respectively storing coordinate data, time for movement execution, function and address data. Inputs to the latter three sections of the input register are provided through manually settable switches 15, 12 and 13, respectively. Write circuits 17 and read circuits 19 are controlled through a control device 18, either automatically from control 20 or through manually operated device 16 termed MAN PROG depending on the position of the switch on the input of control device 18. The address of memory 11 which is written into or read from is obtained from address register ADRREG by addressing circuits 45. MANADR is a manually controlled register for manually selecting a memory address, while BACKREG and REG + 1, and the logic gates associated therewith are used to modify current addresses to obtain new addresses in accordance with signals from control 20, which operates in response to function control signals derived from the FKN section of the read register. Control device 20 may comprise a programmable sequence logic system such as, for example, the ASEA PROMATIC 700.

In general, superordinate or subordinate movement is carried out as follows. The difference between initial and final positions is determined by a summing device ε. The final position is provided by register 22 and the initial position is provided from either register 24 (for subordinate positioning) or register 25 (for superordinate positioning). Registers 24 or 25 derive initial coordinate data from either register 22 or ISREG as determined by control 20 enabling the proper gate. The difference in coordinates is equal to the desired movement and is provided to divider 26 which then divides this quantity by the number of incremental movements with which it will be achieved. The latter quantity is derived from the TIDREG as modified by MULT, which merely multiplies the quantity in TIDREG by a constant obtained from the connected register KONST. The quotient is stored in a KVOT register (27 or 32), the remainder is stored in a REST register (28 or 33) and the dividend is stored in a SAMPLE register (29 or 34). Periodically, (as determined by clock pulses CP) the quantity stored in KVOT is added to the quantity derived by binary frequency multiplier BRM from REST which serves to distribute the remainder displacement uniformly over the movement increments. At each cycle a counter R (30 or 36) is incremented and the instruction is completed when the count in R is equal to the quantity in SAMPLE as determined by comparator COMP (31 or 35) which serves to reset KVOT, REST and SAMPLE and indicates to control 20 that the instruction has been completed. One set of registers, etc. 32–37 and 46 is employed for superordinate movements and the other 27–31 and 38 is employed for subordinate movements. The composite movement signals are provided by adder 39 which is fed by gates 41 and 40 with the superordinate and subordinate signals, respectively.

A program for the movements of a manipulator consists of a number of instructions which are stored in a memory 11. Several different types of instructions may exist, such as displacement orders, reading of input signals, jump to certain instruction, repetition of blocks of instruction, and so on.

Common to all instructions is that they contain information about the type of instruction and number of the instruction, that is, address in the memory. During programming the intended function is selected by means of a switching member 12 and the address is selected by a switching member 13.

In the following only the instructions defining a movement of a robot arm will be dealt with. Those skilled in the art can understand how program loops, jumps and the like are used.

In point-to-point control, the pattern of movement of the robot is defined by a number of discrete positions. A separate positioning instruction is provided for each such position. The instruction contains, among other things, information as to the coordinates of the robot arm in position as well as the time for the movement from the preceding position.

The coordinates of the robot arm, that is, the digital actual values for all coordinate axes, are normally programmed through the so-called training method, that is, the robot is operated manually by means of a member 14, in the figure designated MANCON, to the desired position. The time of movement from the preceding programmed position is selected by a switching member 15. MANCON also provides to the adder 42 signals corresponding to the movement. These signals are provided, through ISREG to the register KOORD and thence by write circuits to the memory 11.

By means of a manual control device 16, in the figure designated MANPROG, write circuits 17 can be controlled manually over a control member for write and read functions 18, so that the values set by means of switching members 12, 13 and 15 plus information contained in a further register element, marked KOORD in the figure, are transferred and stored in the memory 11. Before starting the programming of a pattern of movement, the robot arm is moved manually to its synchronizing or reference position. At that time, an actual value register in the device, designated ISREG, is reset by MANSYNC.

Selection of instruction for manual operation is performed by a manual address selector unit, designated MANADR in the figure. Execution of the instructions takes place by MANPROG. In automatic operation, the instructions are normally executed consecutively, unless the instruction indicates otherwise. When the desired instruction is addressed, read circuits 19 on the output of the memory 11 are actuated (manually or automatically) whereafter information about intended function is transmitted to a control unit 20 by way of a read register section FKN.

By manual programming the actual value of the arm at each position is updated and that value stored in memory 11.

Three different classes of positioning instructions exist, namely normal positioning, superordinate positioning and subordinate positioning. The last two classes are used for generating a complex pattern of movement.

One of the following functions can be selected in the case of normal positioning:

updating of coordinate register KOORDREG 22 from read circuit 19 over gate 21, enabled by control 20 in response to the function provided by section FKN of read register. In this case, the robot arm is not moved since control 20 prevents data from reaching either KVOT register and gates 40 and 41 are blocked. Transmitting the coordinate value merely defines a reference point which may be used for calculating a distance which makes coordinate transformation possible. For example, the next coordinate enables a distance to be computed with regard to the reference point. This enables a common instruction to be used for a specific movement regardless of arm position.

absolute positioning, i.e., the robot arm moves to the programmed position. In this case KOORDREG 22 is updated by the coordinate value stored in the memory 11 as control unit 20 enables gate 21, and KOORDREG 25 by the contents of the actual vaue register ISREG as control unit 20 enables gate 23. The movement is equal to the programmed coordinate value minus the current coordinate value (actual value).

relative positioning, which means the robot are generally does not take the programmed position, except, perhaps for the first loop through a subordinate movement. In this case, the movement for each coordinate axis becomes equal to the programmed coordinate value less the contents of the coordinate register KOORDREG 22. The contents of this coordinte register are then transmitted to the register KOORDREG 25 for the preceding coordinate value before the new coordinate value is transmitted from the memory 11 to the coordinate register KOORDREG 22.

During both normal positioning, superordinate positioning and subordinate positioning, the incremental displacement is obtained by dividing the displacement in a divider 26 by the number of incremental displacements, that is, the time of displacement expressed in the number of sampling intervals. The number of incremental displacements is obtained from the time register TIDREG which is connected to a read register section TID connected to the read circuits 19, and contents of read register section TID provided to the time register TIDREG by the control unit 20 enabling the associated gate and the contents of TIDREG being multiplied in a multiplier MULT by a constant from KONST, which provides the number of incremental displacements which is equal to the number of sampling intervals.

For the normal and superordinate positioning according to the above, the integers in the quotient and the reminder for each coordinate after the division are stored in registers KVOT 27 and REST 28. The remainder is evenly distributed over the time of displacement by a binary frequency multiplier BRM 29. The number of incremental displacements obtained from time register TIDREG and transmitted to a register SAMPLE 29 is compared with the contents of a counter 30 by means of a comparator COMP 31, which counter 30 is reset while at the same time new values are stored in registers KVOT 27 and REST 28. The counter 30 is incremented once every sampling interval. When the contents of the counter 30 are equal to the number of incremental displacements in register SAMPLE 29, registers KVOT 27 and REST 28 are reset by means of a signal R and a signal is transmitted to control unit 20.

At normal positioning, the instruction is terminated either when the desired number of incremental displacements has been made or when the robot arm has adopted the desired position. In case of updating of the coordinate register KOORDREG 22, the instruction is terminated after the coordinate values from read register section KOORD, connection to read circuits 19, have been transmitted to register KOORDREG 22.

In the case of superordinate positioning, only the functions of absolute or relative positioning can be selected; in the case of subordinate positioning only the functions of updating of the coordinate registers and relative positioning can be selected. A superordinate positioning differs from a normal positioning by the fact that a block of instructions containing subordinate positionings can be executed one or several times in parallel to a superordinate positioning being performed. The instructions for the superordinate positioning contain the address to the instruction block for the subordinate positionings and information as to the number of instructions in the block.

The first instruction in the block of instructions for the subordinate positioning is always an updating of coordinate register KOORDREG 22. The last instruction in the block contains the address to the first instruction. Jump to the block of instructions for the subordinate positioning takes place immediately after the values for the superordinate positioning have been clocked in registers KVOT 27, REST 28 and SAMPLE 29, respectively. Execution of the first instruction in the block is ended when coordinate register KOORDREG 22 has been updated. Thereafter, the other subordinate positionings are executed as normal relative positionings.

For the superordinate positioning (the principal movement) the contents of KOORDREG 22 are transmitted to KOORDREG 25 before the new coordinate value is transmitted from the memory 11 to Koordreg 22. Similarly, for the subordinate positioning the preceding coordinate value is transmitted from KOORDREG 22 to KOORDREG 24 before the new coordinate value is fed in from memory 11 to KOORDREG 22.

The computation of the incremental displacements for the subordinate positionings is made by dividing the difference between the contents of coordinate registers KOORDREG 22 and KOORDREG 24 by the number of incremental displacements. Quotient, remainder and incremental displacements are stored in registers KVOT 32, REST 33 and SAMPLE 34, respectively. The remainder is evenly distributed over the time of displacement by a binary frequency multiplier BRM 46. The registers are reset upon signal R from a comparator COMP 35 when the contents of the counter 36 and register SAMPLE 34 are equal, whereafter the next instruction in the block of instructions for the subordinate positioning is executed. While FIG. 10 shows the reset lines for superordinate and subordinate comparators 31, 35 as being common, those skilled in the art will realize that the showing is merely for illustration purposes and in fact these reset lines are separate and separately coupled to control 20. When the last positioning of the subordinate block of instructions is terminated, that is, when all incremental displacements have been performed, jump is, however, made to the first instruction of the block if, and only if, a superordinate positioning is going on and if all incremental displacements have not been made. This is performed through register REG + 1 to address register ADRREG which transmits the address to memory 11 by way of address circuits 45.

the instruction with address according to the register for the next instruction, that is, to the instruction which follows after the instruction for the superordinate positioning if, and only if, superordinate positioning is going on and all incremental displacements have been made. This is then performed by way of the register for the next instruction, marked BACKREG in the figure. The combined movement is thus terminated when all incremental displacements have been made for the superordinate positioning and the block of instructions for the subordinate positioning has been executed a number of times.

the instruction succeeding the last instruction in the block if the subordinate positioning is not made in connection with superordinate positioning. This is only done during manual program execution. During automatic program execution, subordinate positioning instructions are not executed if a superordinate positioning is not under execution.

In case of a superordinate positioning, the output signals from adders 37 (subordinate) and 38 (superordinate) are thereafter summed up by means of a further adder 39. The signals from adders 37 and 38 are connected to adder 39 by way of gates 40 and 41 which are controlled by control unit 20.

The output signal from adder 39 is transmitted over point Q to the position servo, shown in FIG. 11, and further to actual value register ISREG over an adder 42 which adds the incremental value to the previous total value in the register TOTREG after delay by means of a time delay circuit 43 with respect to the pulse train CP from the clock pulse generator.

A clock pulse generator 52 generates a clock pulse train $CP_1$, which is used for control of various elements in the circuit. The pulse train is supplied to the position servo of FIG. 11 and to a division circuit 50, where the pulse frequency is divided by a constant, obtained from unit 51. The value of the constant is selected in the manner described below in connection with FIG. 11. From the division circuit 50 a second clock pulse train CP is obtained, which has a lower frequency than the pulse train $CP_1$, and which is supplied to various units in the circuit of FIG. 10 for control of these units, and also to the position servo in FIG. 11.

FIG. 11 shows a position servo which receives output signals from the point Q in FIG. 10. The object of the position servo is to transform the position of a robot shaft, ordered from the circuit according to FIG. 10, into a real displacement of the robot shaft. The signal from point Q is supplied to a register REG in time with a train, delayed by means of a time delay circuit 44, from clock pulse CP. The contents of register REG is evenly distributed over a sampling interval by means of a binary frequency multiplier BRM, which is clock by the clock pulse train $CP_1$. The frequency of $CP_1$ is higher than that of CP by a factor equal to the constant supplied from unit 51 in FIG. 10. This factor is selected equal to the maximum content of register REG in FIG. 11. If, for instance, the maximum content of REG is 128, the constant from 51 is selected to 128. Between each two succeeding pulses CP the whole content of REG is therefore transmitted to the counter REV by means of the multiplier BRM, and as a binary rate multiplier is used, the pulses supplied to REV will be evenly spaced even if the value in REG only is a fraction of its maximum content. The pulses from BRM count up the reversible counter REV. At constant speed the pulse transducer PG, connected to the system, counts down the counter at the same rate. The output signal from the counter REV thereafter controls a digital/analog converter D/A.

The output signal from the digital/analog converter D/A, which constitutes the speed reference of the system, then controls a speed servo SERVO of conventional construction, for example of type SPA 1115 manufactured by Inland Motor Div. The speed servo is connected to a DC motor M with tachometer TG and pulse transducer PG. The tachometer signal is used as a speed feedback to the speed servo SERVO.

The foregoing apparatus is sufficient to provide for the movement of the robot arm, in accordance with the invention, for one coordinate axis. In practice, there may be five or six axes since the arm is moved in three dimensions, and a "hand" at the end of the arm may be tilted or rotated about the arm in two or three directions. Nevertheless, many components need not be duplicated. More particularly, the apparatus shown in FIG. 10, including the read registers, control 20 and addressing circuits and components above these are used in common for movement in all axes. All other components of FIGS. 10 and 11 must be provided for each coordinate axis, except or MANSYNC, MANCON and the clocking apparatus. To provide for movement about all axes, all apparatus operates simultaneously and, since all apparatus is driven by a common clock, in synchronism.

The method according to the invention is not, of course, limited to the embodiments shown here, but can be varied in many ways within the scope of the appended claims.

As will be clear from the above, a method and means for an industrial robot according to the invention provide considerable advantages. For the relatively very simple complex movement according to FIG. 3, 13 points have to be programmed in in conventional programming. With the aid of the invention, this number is reduced to 5. Normally, however, the subordinate movement is completed a considerable number of times. In conventional programming, therefore, the demand for memory capacity is very great and the programming most time-consuming. With the aid of the invention, there are never required more than three programmed points (plus the two end points of the principal movement) for the movement according to FIG. 3, for example. The saving of memory capacity and programming work therefore normally becomes very considerable. Further, alterations of the principal movement can be performed in a simple manner without the subordinate movement having to be reprogrammed, which is of great practical importance.

In the foregoing, there has been described how control equipment according to the invention can be built up by means of electronic standard circuits. If desired, of course, a microcomputer can be used as an alternative, which can then be programmed in a conventional manner to provide the functions described above.

What is claimed is:

1. Apparatus for moving a controlled device over a predetermined complex path comprising a principal movement between end points A B of said path as well as a superposed movement consisting of a closed loop including successive displacements between points $N_1$, $N_2$...$N_n$, where $N_1$ and $N_n$ are identical and the subscript n has a value of at least 3, said closed loop superposed movement performed at least once during said principal movement, said apparatus comprising:

storage means for storing positioning instructions including data defining said end points A, B and said points $N_1$, $N_2$...$N_n$, and making said data available, dividing means for dividing said principal movement and said superposed movement into a plurality of partial principal and superposed displacements and emitting signals related thereto, summing means for summing said principal and superposed partial displacement signals, and drive means responsive to said summing means for moving said controlled device.

2. The apparatus of claim 1 which further includes a principal register means and superposed register means for respectively storing the result of said division for principal and superposed movements.

3. The apparatus of claim 2 in which positioning instructions include data defining time consumed in executing the movement of said instruction, and said dividing means divides each respective movement by a quantity related to said associated time data.

4. The apparatus of claim 3 which further includes:

counting means associated with each register means for counting each transfer of a partial principal or superposed movement signal to said summing means, comparator means associated with each counting means for comparing its count with the associated quantity related to said time data for resetting the associated register means when said count equals said quantity related to said time data.

5. A method for moving a controlled device over a complex path comprising a principal movement between end points A, B of said path as well as a superposed movement consisting of a closed loop including successive displacements between points $N_1$, $N_2$...$N_n$, where $N_1$ and $N_n$ are identical and the subscript n has a value of at least 3, said closed loop superposed movement performed at least once during said principal movement, said method comprising the steps of:

storing positioning instructions including data defining said end points A, B and said points $N_1$, $N_2$...$N_n$, dividing the principal movement into a plurality of successive partial principal movements, dividing said superposed movements $N_2-N_1$...$N_n-1$ into a plurality of successive partial superposed movements, summing associated partial principal and superposed movements, and moving said controlled device in accordance with said sum.

6. The method of claim 5 in which, an execution time is associated with each said positioning instruction, and both aid principal and superposed movements are divided into partial movements consuming equal increments of time, whereby several successive superposed displacements can be executed simultaneously with a one principal movement.

7. The method of claim 5 in which said superposed movement is performed more than once during said principal movement.

8. The method of claim 5 in which said dividing step divides both principal and superposed movements into a plurality of equal partial principal movements and a plurality of equal patial superposed movements.

* * * * *